Feb. 16, 1926.  
R. T. PIERCE  
1,572,950  
GRAPHIC METER CONTROL MECHANISM  
Filed July 11, 1922   2 Sheets-Sheet 1
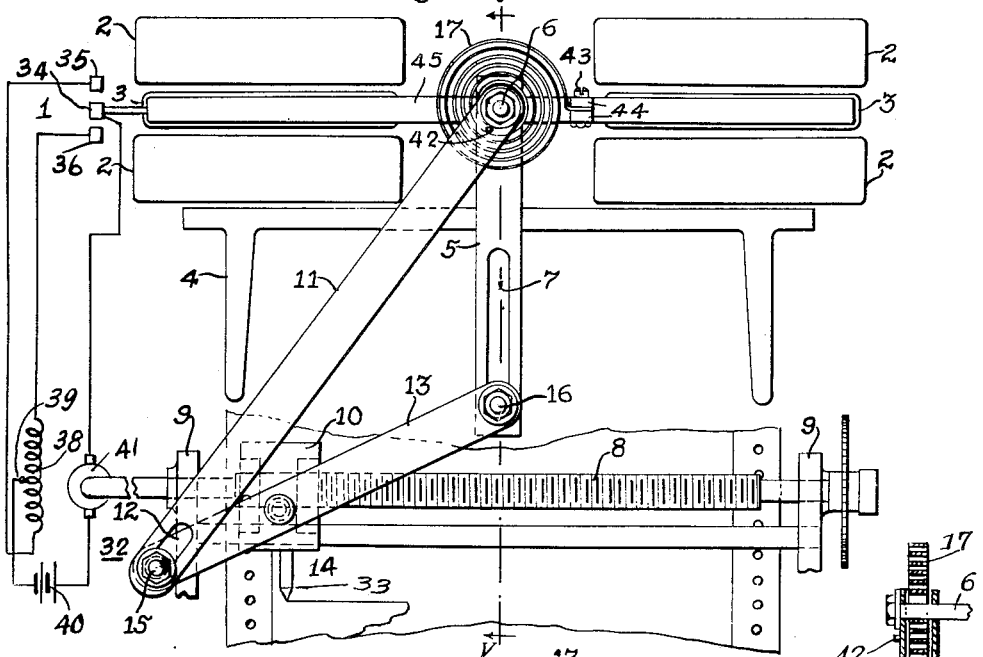
Fig.1.
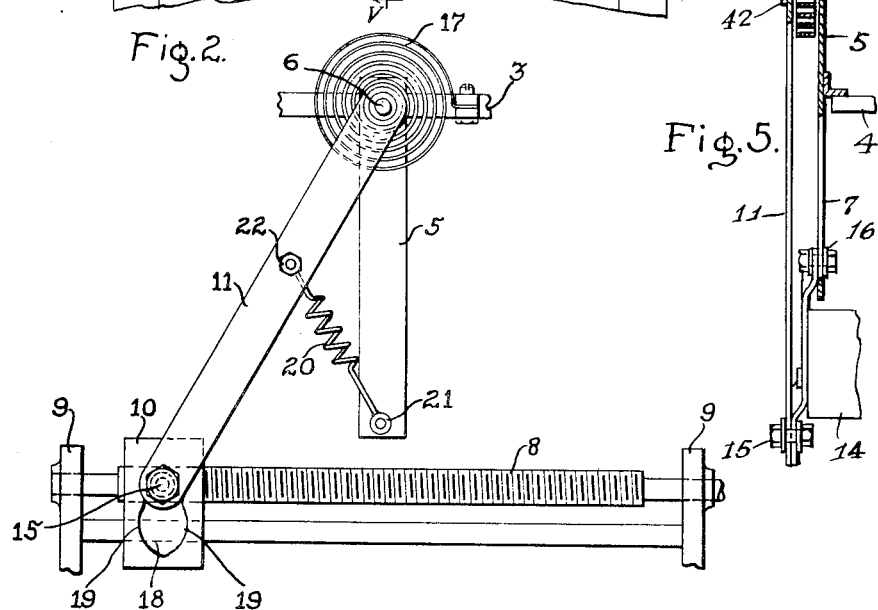
Fig.2.
Fig.5.
WITNESSES:  
R. J. Butler.  
F. H. Miller
INVENTOR  
Raymond T. Pierce.  
BY  
Wesley J. Carr  
ATTORNEY

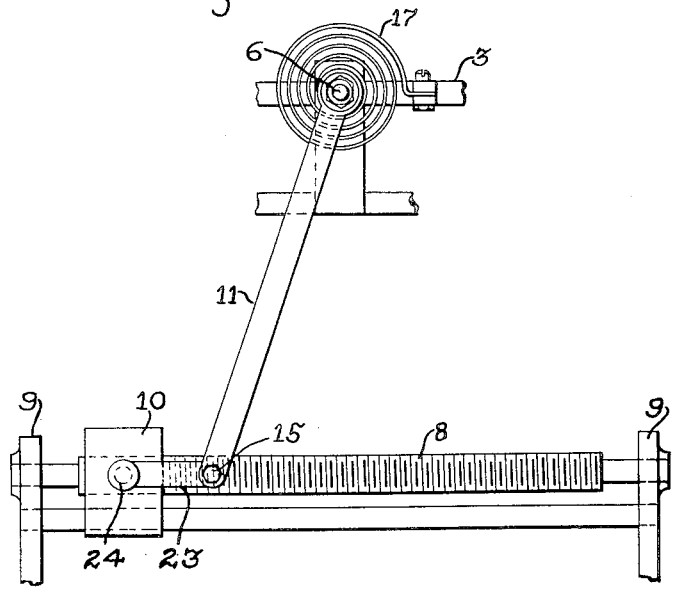
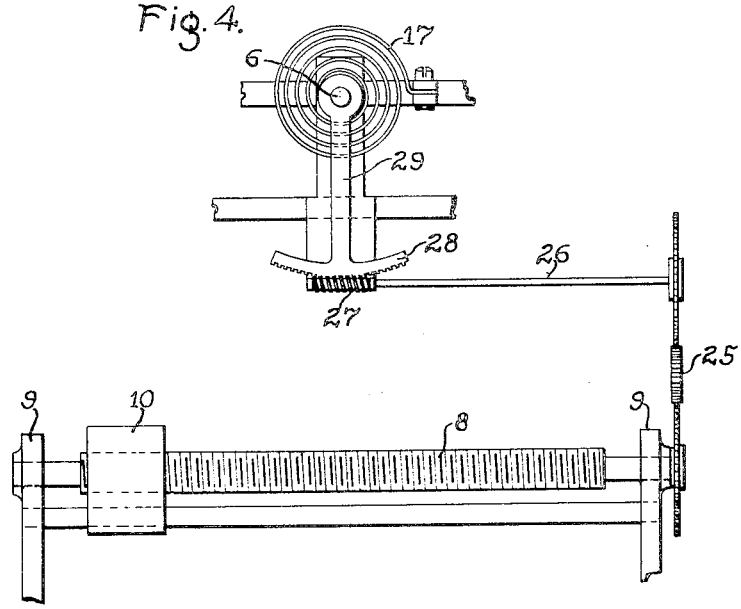

Patented Feb. 16, 1926.

1,572,950

UNITED STATES PATENT OFFICE.

RAYMOND T. PIERCE, OF EAST PITTSBURGH, PENNSYLVANIA, ASSIGNOR TO WEST-INGHOUSE ELECTRIC & MANUFACTURING COMPANY, A CORPORATION OF PENNSYLVANIA.

GRAPHIC-METER-CONTROL MECHANISM.

Application filed July 11, 1922. Serial No. 574,261.

*To all whom it may concern:*

Be it known that I, RAYMOND T. PIERCE, a citizen of the United States, and a resident of East Pittsburgh, in the county of Allegheny and State of Pennsylvania, have invented a new and useful Improvement in Graphic-Meter-Control Mechanisms, of which the following is a specification.

My invention relates to measuring instruments and particularly to electrical measuring instruments of the graphic or recording type.

One object of my invention is to provide a device of the above-indicated character that shall give accurate indications over its entire range of movement.

Another object of my invention is to provide a measuring instrument comprising angularly and rectilinearly movable members responsive to proportionate impulses that shall be so connected as to oppose movement of the angularly movable member by proportionally varying amounts in accordance with the direction and extent of the movement of the rectilinearly movable member.

In certain electrical measuring instruments of the graphic or recording type, such as that shown in Patent No. 1,289,503, for an electrical measuring instrument issued December 31, 1918, to P. MacGahan, it has heretofore been usual to provide an indicating member or stylus adapted to be moved horizontally across a record sheet. A Kelvin balance disposed above the indicating member and responsive to a quantity of the circuit to be measured was provided to control the movement of the indicating member through a pilot motor. Further, a pivoted cam-and-spring connection between the movable member of the balance and the indicating member was provided to oppose movement of the balance by increasing amounts in accordance with increase in the quantity being measured.

By reason of frictional wear between the angularly movable cam and the rectilinearly movable indicating member movements of the indicating member were not accompanied by proportionate movements of the angularly movable member at all times and, consequently, the spring was not actuated and the balance was not opposed in proportion to movement of the indicating member. This caused erroneous readings on certain portions of the scale.

In practicing my invention I provide an angularly movable member or a Kelvin balance pivotal element that is so connected to a rectilinearly movable indicating member or traveling pen carriage that the pivotal or angular movement of the balance element is more uniformly opposed by forces in accordance with the direction and extent of movement of the indicating member throughout the length of movement of the latter.

Figure 1 of the accompanying drawings is a view of a portion of an electrical measuring instrument embodying one form of my invention, and Figs. 2, 3 and 4 are views similar to Fig. 1 of modified forms thereof.

A Kelvin balance 1, comprising stationary coils 2 and movable coils 3, may be suitably mounted on a bracket 4, constituting a part of the instrument. A member 5, on the bracket 4, supports a pivot pin 6 of the movable coils 3 and is provided, at its lower portion, with a vertical slot 7. A horizontally disposed screw shaft 8, supported in brackets 9 and adapted to be operated in a usual manner by a pilot motor 32 is provided with a traveling nut member 10 for supporting a stylus or other indicating means 33.

In accordance with well known practice, not deemed necessary of illustration, the coils 2 and 3 are connected to a circuit to actuate the coils 3 about their pivot shaft 6, in accordance with a quantity to be measured. This movement of the coils 3 actuates a contact member 34, carried thereby, to engage one or the other of stationary contact members 35 and 36, to control the direction and extent of movement of the traveling nut 10 on the shaft 8.

The contact members 35 and 36 are connected to opposite terminals of the field winding 38, an intermediate tap 39 of which is connected, through a battery 40 or other source of electromotive force and the armature 41 of the motor 32, to the movable contact member 34.

An arm 11 is loosely pivoted, at its upper end, on the shaft 6, and is provided, at its lower end, with a slot 12. An arm 13, pivoted by a pin 14 on the nut 10, is connected to the arm 11 and the member 5 by pins 15 and 16 disposed in the slots 12 and 7, respectively.

A spiral spring 17 is connected, at its inner end, to the arm 11, by a pin 42, and, at its outer end, by a screw 43, to lugs 44 on the movable supporting element 45 of the movable coils 3.

In operation, when the coils 2 and 3 are energized to move the coils 3, the contact member 34 engages one or the other of the contact members 35 and 36 and the pilot motor is actuated to turn the shaft 8. Consequently, the nut 10 is actuated to move the arm 13 bodily therewith. Thus, when an impulse or actuating force is imparted to the angularly movable coils 3, an impulse is imparted to the pilot motor 32 and to the nut 10. Thus, the coils 3 and the nut 10 both move distances in accordance with the quantity being measured but these distances are different in both magnitude and direction, the coils moving angularly about the shaft 6 and the nut moving rectilinearly along the shaft 8, as will be apparent in the succeeding description. During movement of the nut 10, the pin 16 moves upwardly in the slot 7 to turn the arm 13 in a counter-clockwise direction about the pin 14. As the nut approaches the center of the shaft 8, the pin 15 will also move upwardly in the slot 12. Movement to the right of the center of the shaft 8 causes the pins 16 and 15 to move downwardly again in the slots 7 and 12, respectively. The relation of the parts is such that during the movement of the nut 10 between the ends of the shaft 8, the spring 17 will be wound and unwound in substantially exact proportion to the movement of the nut 10 and to thereby oppose movement of the coils 3 in accordance with movement of the nut.

In the form of my invention shown in Fig. 2, the nut 10 is provided with an opening 18 having side or cam surface portions 19 against which the pin 15 slides during the movement of the nut. The surfaces 19 are shaped to compensate for the differences between the angular movement of the arm 11 and the rectilinear movement of the nut 10. A spring 20 connected between the members 5 and 11 by pins 21 and 22, respectively, is provided to maintain the pin 15 in engagement with the surfaces 19. In traveling from one side to the other of the center of the shaft 8, the pin 15 will be disengaged from one of the surfaces 19 and start its movement along the other surface 19.

In the device shown in Fig. 3, the arm 11 is pivotally connected to a link 23 that is pivoted, by a pin 24, to the nut 10. The arrangement of parts in this form operates similarly to the above-described forms to compensate for the differences in movement between the nut 10 and the coils 3.

In Fig. 4, the spring 17 is adapted to be moved equal amounts, in accordance with equal amounts of movement of the nut 10, by a system of gears 25 connected from the shaft 8 to a shaft 26 upon which is mounted a worm screw 27. The latter meshes with a segmental gear portion 28 of an arm 29 that is loosely pivoted on the shaft 6, and an opposing force proportionate to movement of the nut 10 is transmitted from the arm 29 to the coils 3, through the spring 17.

By my invention, a graphic meter is obtained which is more accurate over the entire range of movement of the indicating member thereof.

While I have shown and described particular forms of my invention, changes may be effected therein without departing from the spirit and scope thereof, as set forth in the appended claims.

I claim as my invention:

1. In a measuring instrument, the combination with a rectilinearly-movable indicating member and a Kelvin balance for controlling the operation of the same, of an angularly-movable member having its axis of movement extending parallel to the pivot axis of the balance, said angularly-movable member being operatively related to the indicating member to be moved about its axis in accordance with movement of the indicating member and being yieldably connected to the balance.

2. In a measuring instrument, the combination with a retilinearly-movable indicating member and a Kelvin balance for controlling the operation of the same, of an angularly-movable member having its axis of movement extending parallel to the pivot axis of the balance, said angularly-movable member being operatively related to the indicating member to be moved about its axis in accordance with movement of the indicating member, and a spiral spring connected between said angularly-movable member and the balance to be stressed about its axis.

3. In a measuring instrument, the combination with an indicating member and a Kelvin balance for controlling the operation of the same, of a spiral spring connected to the balance and adapted to be stressed about its axis in accordance with the operation of the indicating member to control the movement of the balance.

4. In a measuring instrument, the combination with an indicating member and a Kelvin balance for controlling the operation of the same, of a spiral spring connected to the balance and means for translating rectilinear movements of the indicating member into movements of the spring about its axis.

5. In a measuring instrument, the combination with a rectilinearly movable indicating member and a Kelvin balance for controlling the movement thereof, of means, including a spiral spring, connected between the indicating member and the Kelvin balance around the pivot axis of the balance and stressed in response to relative movement between the indicating member and the balance for opposing movement of the latter by proportionately varying forces in accordance with the direction and extent of movement of the indicating member.

6. In an electrical measuring instrument, the combination with a rectilinearly-movable indicating member and a Kelvin balance for controlling the operation thereof, of a member loosely pivotally mounted relative to the pivot axis of the balance, a spiral spring connected between the balance and the loosely-pivoted member, and means for transmitting movements of the indicating member to the pivoted member.

7. In an electrical measuring instrument, the combination with a rectilinearly-movable indicating member and a Kelvin balance for controlling the operation thereof, of a member loosely pivotally mounted relative to the pivot axis of the balance, a spiral spring connected between the balance and the loosely-pivoted member, and means for transmitting movements of the indicating member to the pivoted member.

8. In an electrical measuring instrument, the combination with a motor-actuated screw shaft, an indicating traveling-nut member thereon, and a Kelvin balance for controlling the operation of the motor, of an arm pivoted on the pivot axis of the balance and movable relative to the balance, a spiral spring disposed around said pivot axis having one end fixed to the balance and the other end fixed to said arm, and means connected between the nut and said arm for stressing the spring to oppose movement of the balance by forces in accordance with the direction, and in proportion to the extent, of movement of the nut.

9. In an electrical measuring instrument, the combination with a rectilinearly-movable indicating member and a Kelvin balance for controlling the operation thereof, of means for affecting the balance by forces caused by movements of the indicating member and compensating for differences in the movements of the indicating member and balance comprising a lost-motion link mechanism including a member loosely pivotally related to the pivot axis of the balance, and a spiral spring connected between the balance and the loosely-pivoted member.

In testimony whereof, I have hereunto subscribed my name this first day of July 1922.

RAYMOND T. PIERCE.